Dec. 22, 1925.　　　　　　　　　　　　　　　1,566,687
J. F. O'CONNOR
FRICTION SHOCK ABSORBING MECHANISM
Filed Oct. 12, 1923　　　2 Sheets-Sheet 1
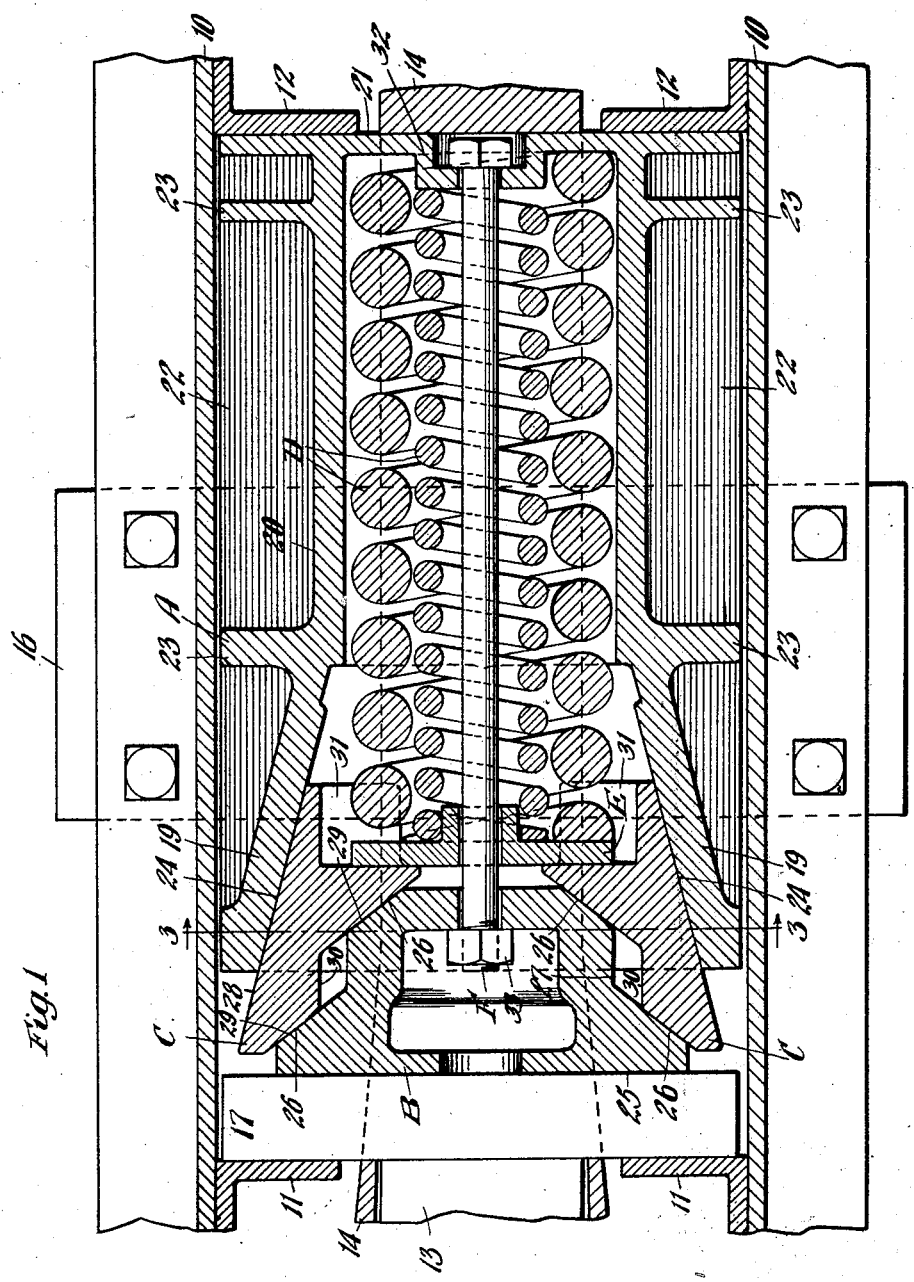
Witnesses
Wm. Geiger
Inventor
John F. O'Connor
By George I. Haight
His Atty.

Dec. 22, 1925.    J. F. O'CONNOR    1,566,687
FRICTION SHOCK ABSORBING MECHANISM
Filed Oct. 12, 1923    2 Sheets-Sheet 2
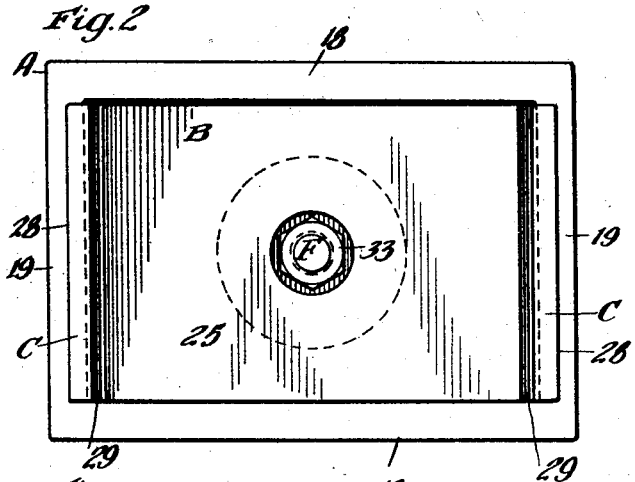
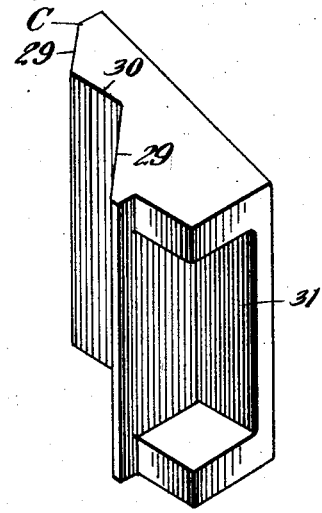
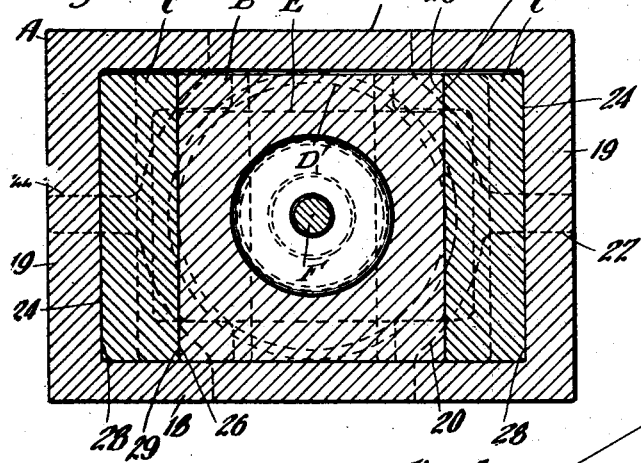
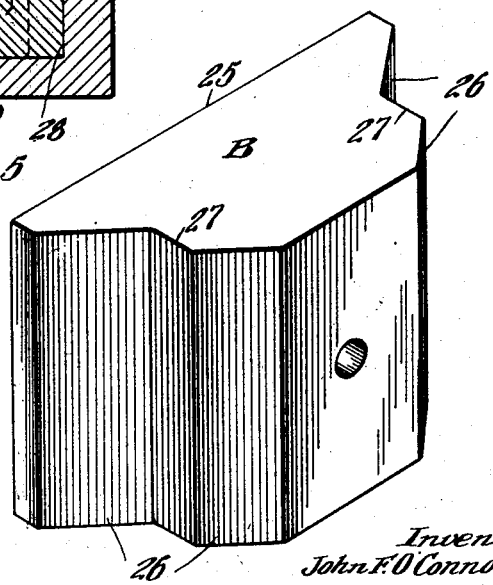
Witnesses
Wm. Geiger
Inventor
John F. O'Connor
By George I. Haight
His Atty.

Patented Dec. 22, 1925.

1,566,687

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed October 12, 1923. Serial No. 668,055.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings, wherein are obtained high capacity and certain release.

More specifically, an object of the invention is to provide a mechanism of the character indicated, wherein a differential wedge action is had during the compression stroke.

Other objects and advantages of the invention will more clearly appear from the description and claim hereinafter following.

In the drawings forming a part of this specification, Figure 1 is a horizontal, longitudinal, sectional view of a portion of a railway draft rigging, showing my improvements in connection therewith. Figure 2 is a front end elevational view of the friction shock absorbing mechanism proper. Figure 3 is a transverse, vertical, sectional view corresponding substantially to the line 3—3 of Figure 1. Figure 4 is a detailed, perspective view of one of the wedge friction shoes. And Figure 5 is a detailed perspective view of the pressure transmitting element.

In said drawings, 10—10 denote channel draft sills of the usual type, the same having front stop lugs 11 and rear stop lugs 12 secured to the inner faces thereof. The friction shock absorbing mechanism proper is operatively associated with a drawbar 13 by means of a hooded cast yoke 14, said yoke and the parts therewithin being supported in operative position by a detachable saddle plate 16. A front follower 17 of ordinary form is employed with the shock absorbing mechanism proper.

The improved shock absorbing mechanism proper, as shown, comprises, broadly, a combined friction shell and spring cage casting A; a pressure transmitting element B; a pair of wedge friction shoes C—C; a spring resistance D; a spring follower E; and a retainer bolt F.

The combined friction shell and the spring cage casting A, as shown, is of rectangular cross section at its outer or front end, the same having top and bottom walls 18—18 and side walls 19—19. Rearwardly of the friction shell portion of the casting defined by the walls 18 and 19, the same is made of reduced cross section as indicated at 20 to provide the spring cage, having an integral rear wall 21 laterally extended to cooperate with the rear stop lugs 12 in the manner of the usual rear follower. The shell is also reinforced by longitudinally extending central webs 22 and vertically disposed webs 23—23. The inner faces of the side walls 19—19 converge inwardly of the shell, thereby providing wedge friction faces 24 extending at relatively keen angles with reference to the longitudinal axis of the mechanism.

The wedge pressure transmitting element B is in the form of a hollow casting having a flat front end face 25, a plurality of spaced side wedge faces 26—26 connected by flat faces 27, the wedge faces 26 being arranged at relatively blunt angles with reference to the longitudinal axis of the mechanism. The front end face 25 of the pressure transmitting element is adapted to coact with the flat rear face of the front follower. In the instance shown, the wedge is provided with two pairs of spaced wedge faces 26 located at opposite sides of the same, but it will be evident that the number of faces may be varied.

The wedge friction shoes C are two in number and of similar construction, being disposed on opposite sides of the wedge pressure transmitting member and interposed between the latter and the side walls 19 of the friction shell. Each of the wedge shoes C is provided with an outer flat face 28 similarly inclined to the wedge face 24 of the adjacent side of the friction shell and adapted to coact therewith, and a pair of spaced inner wedge faces 29—29 connected by a flat face 30, the faces 29 being correspondingly inclined to the wedge faces 26 of the pressure transmitting element C and adapted to cooperate therewith. Each of the shoes is also cut away at the rear end to provide a pocket 31 adapted to receive one side of the spring follower E.

The inner ends of the friction shoes are directly engaged by the spring follower E which has the opposite ends thereof extending into the sockets 31, the spring follower in turn coacting with the spring resistance D interposed between the latter and the rear wall 21 of the spring cage.

The parts are held in the assembled relation and under initial compression by the retainer bolt F, having the head thereof anchored in a hollow boss 32 on the rear wall 21 and having the opposite end anchored within the hollow pressure transmitting wedge B by the nut 33, the spring follower E being perforated to receive the shank of the bolt. As clearly shown in Figure 1, the opposite ends of the inner coil of the spring resistance bear on the boss 32 and the inner face of the spring follower E respectively, the spring follower E being provided with a boss 34 extending into the spring to hold the same properly centered.

The operation of the mechanism, assuming an inward or buffing movement of the drawbar, is as follows. As the follower 17 is moved inwardly toward the shell, the pressure transmitting element B will be forced inwardly thereby setting up a wedging action between the shell and the shoes C and moving the shoes inwardly of the shell. During the inward movement of the wedge system, as the wedge faces 28 of the shoes travel on the wedge faces 24 of the shell, there will be a simultaneous movement of the shoes inwardly relatively toward each other transversely of the mechanism, thereby causing a differential wedge action, the faces 29 of the shoes slipping inwardly on the relatively blunt wedge faces 26 of the pressure transmitting element until inward movement of the follower 17 is limited by the follower 17 abutting the front end of the shell, the force then being transmitted directly through the shell. When the actuating pressure is reduced, the wedge B will drop away from the shoes due to the bluntness of the engaging wedge faces thereof, thereby reducing the lateral pressure on the shoes and effecting instant release of the wedging system.

During draft, the operation of the mechanism is the reverse of that just described, the casting A being moved toward the front follower 17 which is held stationary.

It will be evident that the retainer bolt not only maintains the parts in assembled relation and limits their outward movement but also holds them under initial compression whereby compensation for wear on the engaging faces of the parts is had.

I have herein shown and described what I now consider the preferred manner of carrying out my invention, but the same is merely illustrative and I contemplate all changes and modifications which come within the scope of the claim appended hereto.

I claim:

In a friction shock absorbing mechanism, the combination with a casing having a pair of opposed flat, inwardly converging wedge faces, said faces being disposed at relatively keen angles with reference to the axis of the mechanism; of a wedge pressure transmitting element adapted to directly cooperate with a main follower, said element having tandem arranged pairs of wedge faces disposed at relatively blunt angles with reference to said axis, said tandem arranged faces of each pair being spaced longitudinally apart and arranged respectively at the inner and outer ends of the wedge pressure transmitting element; a pair of friction wedge shoes, each having a wedge face coacting with the corresponding wedge faces of said pressure transmitting element, said shoes being laterally slidable on the wedge faces of said wedge pressure transmitting element, said shoes being spaced apart transversely of the mechanism to permit lateral approach thereof during a compression stroke; and a spring resistance opposing inward movement of said shoes.

In witness that I claim the foregoing I have hereunto subscribed my name this 10th day of October 1923.

JOHN F. O'CONNOR.